United States Patent
Liu et al.

(10) Patent No.: US 10,378,502 B2
(45) Date of Patent: Aug. 13, 2019

(54) RETARDED INTAKE CAM PHASER TO IMPROVE ENGINE START/STOP QUALITY

(71) Applicant: BorgWarner Inc., Auburn Hills, MI (US)

(72) Inventors: Xiaobing Liu, Rochester Hills, MI (US); Paul Nahra, Shelby Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 111 days.

(21) Appl. No.: 15/124,049

(22) PCT Filed: Mar. 3, 2015

(86) PCT No.: PCT/US2015/018389
§ 371 (c)(1),
(2) Date: Sep. 7, 2016

(87) PCT Pub. No.: WO2015/138185
PCT Pub. Date: Sep. 17, 2015

(65) Prior Publication Data
US 2017/0082082 A1  Mar. 23, 2017

Related U.S. Application Data

(60) Provisional application No. 61/953,260, filed on Mar. 14, 2014.

(51) Int. Cl.
*F01L 1/34* (2006.01)
*F02P 5/15* (2006.01)
(Continued)

(52) U.S. Cl.
CPC ............. *F02P 5/1506* (2013.01); *F01L 1/344* (2013.01); *F02D 13/0238* (2013.01);
(Continued)

(58) Field of Classification Search
CPC ............. F02N 11/0814; F02N 11/0803; F02N 11/0844; F02N 19/004; Y02T 10/18; F02P 5/1506; F01L 1/344; F02D 13/0238
(Continued)

(56) References Cited

U.S. PATENT DOCUMENTS 7,561,957 B1 * 7/2009 Santoso ............. F02D 13/0246
701/113
8,527,120 B2  9/2013 Matthews et al.
(Continued)

FOREIGN PATENT DOCUMENTS

CN  101749132 A  6/2010
JP  2011174434 A  9/2011

OTHER PUBLICATIONS

Chinese Office Action dated May 4, 2018, Application No. 201580011557.8; Applicant: BorgWarner Inc.; 23 pages.
International Search Report and Written Opinion; dated Jun. 18, 2015; for International Application No. PCT/US2015/018389; 14pages.
Chinese Office Action dated Jan. 18, 2019; Application No. 201580011557.8; Applicant: BorgWarner Inc.; 7 pages.

*Primary Examiner* — Hai H Huynh
*Assistant Examiner* — Gonzalo Laguarda
(74) *Attorney, Agent, or Firm* — BrooksGroup

(57) ABSTRACT

A number of variations may include a method comprising controlling the combustion phase timing in the first firing cycle of a start/stop combustion engine comprising: providing a camshaft operatively connected to an extended range intake cam phaser; fully or partially retarding the extended range intake cam phaser during an engine restart to control a position of the camshaft and prevent pre-ignition; and retarding a spark timing in the first cylinder to delay the combustion phase timing to improve NVH.

15 Claims, 3 Drawing Sheets

(51) Int. Cl.
*F01L 1/344* (2006.01)
*F02D 13/02* (2006.01)
*F02N 11/08* (2006.01)
*F02N 19/00* (2010.01)
*F02P 5/152* (2006.01)

(52) U.S. Cl.
CPC ...... *F02N 11/0803* (2013.01); *F02N 11/0844* (2013.01); *F02D 2013/0292* (2013.01); *F02N 11/0814* (2013.01); *F02N 19/004* (2013.01); *F02P 5/1521* (2013.01); *Y02T 10/18* (2013.01); *Y02T 10/46* (2013.01)

(58) Field of Classification Search
USPC ......... 123/90.15, 90.16, 90.17, 179.3, 179.4, 123/179.18, 406.53; 701/103, 112, 113
See application file for complete search history.

(56) References Cited

U.S. PATENT DOCUMENTS

| | | | |
|---|---|---|---|
| 2007/0209619 A1* | 9/2007 | Leone | B60W 10/06 123/90.12 |
| 2008/0257310 A1* | 10/2008 | Theobald | B60K 6/24 123/41 E |
| 2010/0211288 A1* | 8/2010 | Gibson | F02D 13/0261 701/103 |
| 2012/0010792 A1 | 1/2012 | Nedorezov et al. | |
| 2012/0277983 A1 | 11/2012 | Makino | |

* cited by examiner

RETARDED INTAKE CAM PHASER TO IMPROVE ENGINE START/STOP QUALITY

CROSS-REFERENCE TO RELATED APPLICATIONS

This application claims the benefit of U.S. Provisional Application No. 61/953,260 filed Mar. 14, 2014.

TECHNICAL FIELD

The field to which the disclosure generally relates to include stop/start systems.

BACKGROUND

A vehicle may include a stop/start system.

SUMMARY OF ILLUSTRATIVE VARIATIONS

One variation may include a method comprising controlling the combustion phase timing in the first firing cycle of a start/stop combustion engine comprising: providing a camshaft operatively connected to an extended range intake cam phaser; fully or partially retarding the extended range intake cam phaser during an engine restart to control a position of the camshaft and prevent pre-ignition; and retarding a spark timing in the first firing cycle to delay the combustion phase timing to improve noise, vibration and harshness (NVH).

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

In a number of variations, any number of combustion engines including, but not limited to, a port-fuel injection engine or a gasoline direct injection engine may include a stop/start system. A start/stop system may automatically shut down and/or restart an engine which may decrease the time the engine may be idling which may improve a vehicle's fuel economy and reduce emissions coming from the vehicle.

In a number of variations, a start/stop system may automatically shut off the engine depending on any of a number of vehicle conditions including, but not limited to, the battery State of Charge (SOC), the engine coolant temperature, the brake pressure reaching a certain point, and/or when a certain steering wheel angle occurs. The engine may restart once a driver begins to release the brake pedal. In a number of variations, an engine restart may also occur as a result of a condition not initiated by the driver including, but not limited to, low battery State of Charge and/or NC or heating demand.

Figure 1:
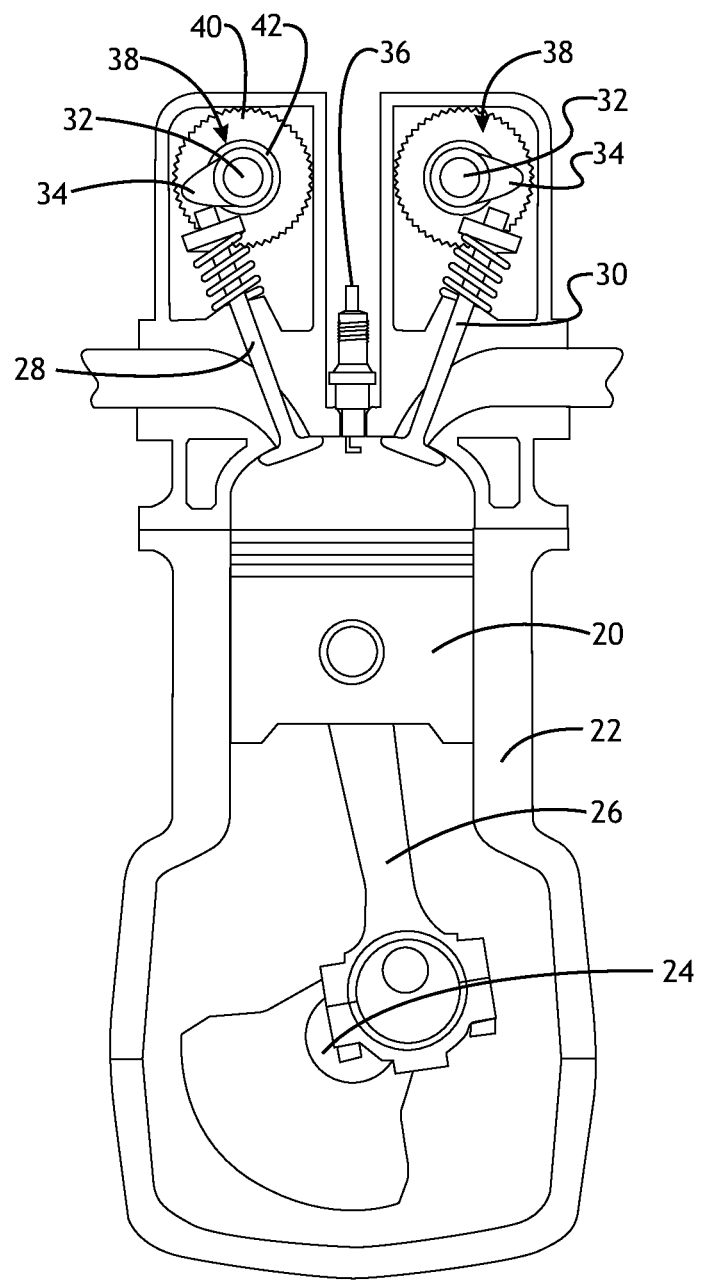
FIG. 1 illustrates a combustion engine piston system according to a number of variations.

Referring to FIG. 1, in a number of variations, an engine may include one or more pistons 20 which may each be located inside of a cylinder 22. The pistons 20 may be attached to a crankshaft 24 by a connecting rod 26. The crankshaft 24 may cause the piston 20 to move upward and downward inside of the cylinder 22. An intake valve 28 and an exhaust valve 30 may be located at the top of the cylinder 22. The intake valve 28 may allow air/fuel to enter into the cylinder 22 while the exhaust valve 30 may allow exhaust to exit the cylinder 22. A camshaft 32 may be located above each of the intake valve 28 and the exhaust valve 30 and may include a plurality of lobes or cams 34 which may open the intake valve 28 or the exhaust valve 30 as the camshaft 32 rotates. A spark plug 36 may be located at the top of each of the cylinders 22. The spark plug 36 may provide a spark that may ignite an air/fuel mixture so that combustion may occur.

An extended range intake cam phaser 38 may be used to rotate the position of the camshaft 32 in relation to a vehicle's timing chain. An extended range intake cam phaser 38 may include a range of 70 to 80 crank angle degrees which is 20-30 degrees greater than a standard cam phaser, which includes a range of 50 crank angle degrees. In a number of variations, an extended range intake cam phaser 38 may include an outer sprocket 40 and an inner rotor 42. The outer sprocket 40 may be operatively connected to the timing chain (not illustrated) while the inner rotor 42 may be operatively connected to the camshaft 32. The extended range intake cam phaser 38 may be used to advanced or retard the timing of the camshaft 32 which may vary the timing of the opening and/or closing of the valves 28, 20 by adjusting the rotation angle of the camshaft 32. Any number of extended range intake cam phasers 38 known to those skilled in the art may be used to selectively change the angle of the camshaft having a range of 70 to 80 crank angle degrees including, but not limited to, a dual park extended range cam phaser.

Figure 3:
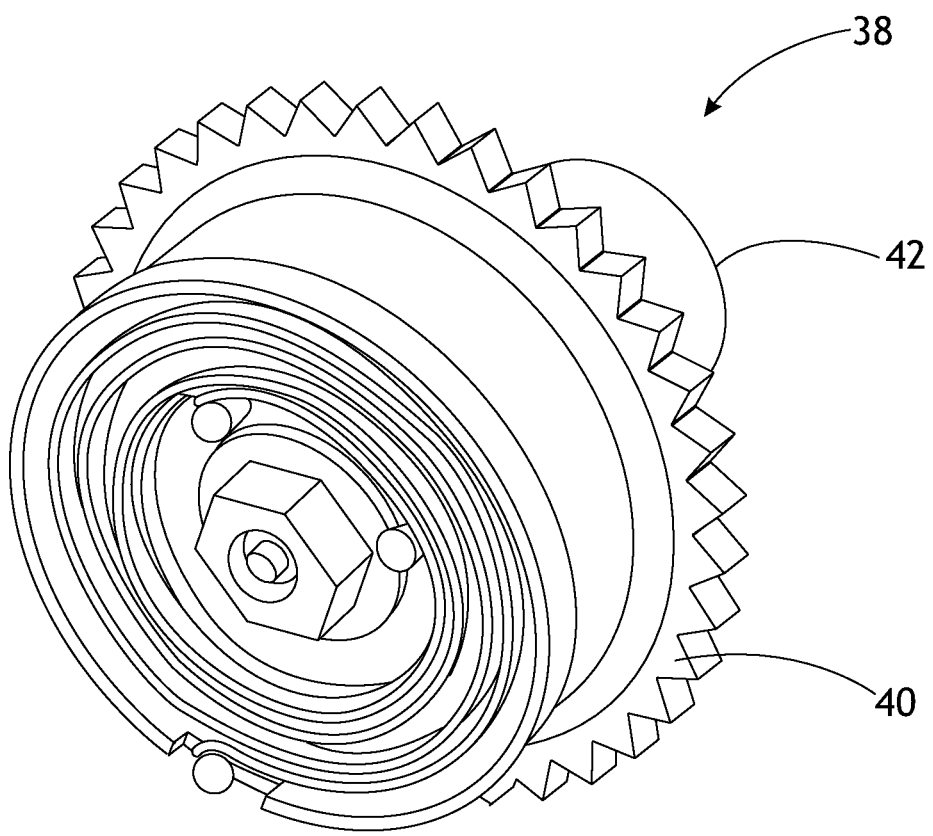
FIG. 3 illustrates an extended range intake cam phaser according to a number of variations.

Referring to FIG. 3, a dual park extended range cam phaser 38 may allow the selection of two distinct cam positions which may each be used for a specific engine starting condition. This may allow the autostart to occur when the extended range intake cam phaser 38 is in a fully or partially retarded position for a warm restart of the engine or a default mid-locking position for a conventional cold start of the engine.

In a number of variations, an engine may go through one or more cycles. In an engine cycle, a piston 20 may begin at the top of the cylinder 22, the camshaft 32 may rotate which may cause the cam 34 to open the intake valve 28 to open while the piston 20 may move downward which may allow air/fuel to enter and fill the cylinder 22. This may be called the intake stroke. The piston 20 may then move back upward which may compress the air/fuel. The combustion process may occur as the piston 20 approaches top dead center, or the top of its stroke, and the spark plug 36 may provide a spark which may ignite the fuel. The fuel charge in the cylinder 22 may burn which may cause the piston 20 to move back downward. As the piston 20 reaches bottom dead center, or the bottom of its stroke, rotation of the cam 34 on the camshaft 32 may cause the exhaust valve 30 to open which may allow exhaust to exit from the cylinder 22. This cycle may then be repeated.

In a number of variations, combustion may start before the spark is discharged. This may be known as pre-ignition. With a stop/start vehicle, the engine may be turned off for a short period of time and when the driver attempts to restart, for example by releasing the brake pedal, the first combustion cycle may pre-ignite. This may cause noise, vibration, and/or harshness (NVH) of the vehicle.

In a number of variations, spark timing may be used to control the combustion process in a stop/start vehicle. The relationship of combustion to where the piston 20 is at in the cylinder 22 may be known as combustion phasing. In a number of variations, the spark timing may be delayed which may "retard" the combustion phase timing to later in the cycle which may reduce and/or eliminate auto-ignition which may reduce NVH of the vehicle.

Figure 2:
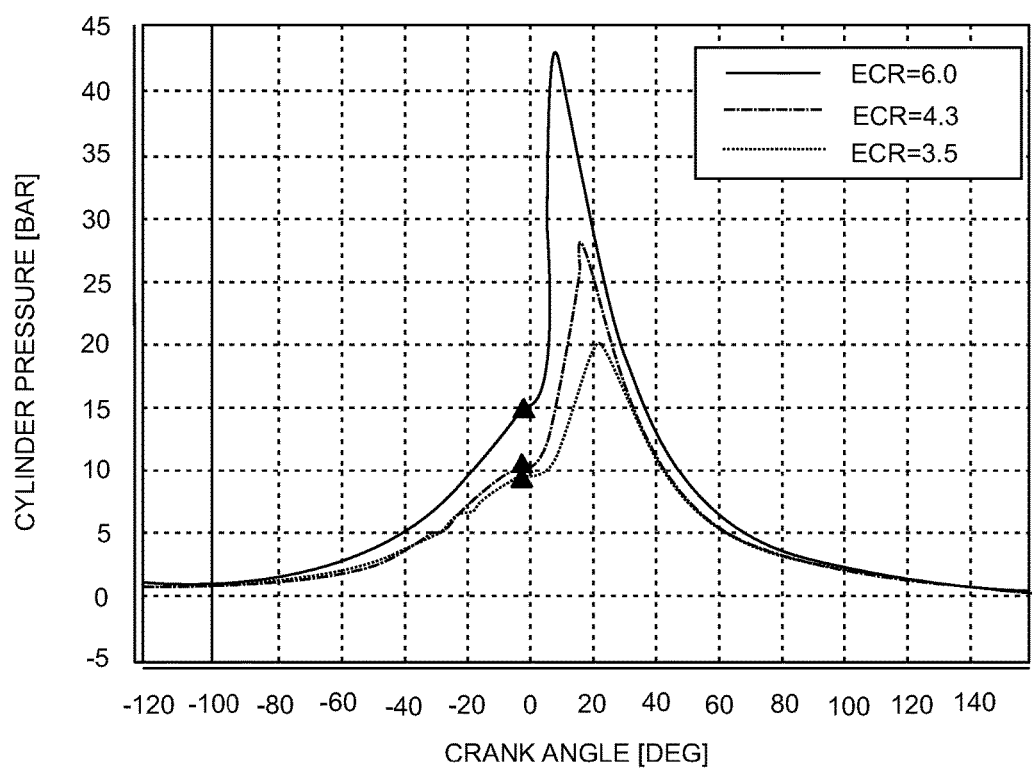
FIG. 2 illustrates various effective compression ratios (ECR) resulting from different cam phaser positions according to a number of variations.

In a number of variations, a compression ratio of a combustion engine may be the ratio of the maximum volume in the cylinder 22 to the minimum volume in the cylinder 22. The engine stop/start quality may be improved as the compression ratio is lowered. During an engine restart event, a standard intake cam phaser including a range of 50 crank angle degrees, may be in a fully retarded position and may include an effective compression ratio (ECR) at 6.0 or higher, for example as illustrated in FIG. 2. With the standard intake cam phaser, when an engine is warmed up, a spark may occur anywhere between 2 degrees before top dead center to 22 degrees after top dead center which may result in pre-ignition.

In a number of variations, an extended range intake cam phaser 38, for example as illustrated in FIGS. 1 and 3, may be used to retard the intake cam timing which may prevent and/or reduce pre-ignition from occurring in the first cycle which may allow spark retard leading to reduced vibration, noise, and harness (NVH) levels in the vehicle.

In a number of variations, retarding the extended range intake cam phaser 38 an additional 20-30 degrees further than a standard range intake cam phaser may allow the position of the camshaft 32 to be controlled which may allow the closing of the intake valve 28 to be delayed which may reduce the compression ratio. In one variation, retarding the extended range intake cam phaser 38 an additional 20 degrees further than a standard cam phaser may result in a compression ratio of 4.3, while retarding an additional 30 degrees further than a standard cam phaser may result in a compression ratio of 3.5, for example as illustrated in FIG. 2. Retarding the extended range intake cam phaser 38 an additional 20-30 degrees further than a standard intake cam phaser may allow the spark timing to be retarded in the first cylinder up to 22 degrees after top dead center which may prevent and/or reduce pre-ignition.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a method comprising: controlling the combustion phase timing in a first firing cycle of a stop/start combustion engine comprising: providing a camshaft operatively connected to an extended range intake cam phaser; fully or partially retarding the extended range intake cam phaser during an engine restart to control a position of the camshaft and prevent pre-ignition; and retarding a spark timing in the first cycle to delay a combustion phase timing to improve NVH.

Variation 2 may include a method as set forth in Variation 1 wherein the engine restart is a warm restart.

Variation 3 may include a method as set forth in any of Variations 1-2 wherein the extended range intake cam phaser comprises a range of 70 crank angle degrees.

Variation 4 may include a method as set forth in any of Variations 1-2 wherein the extended range intake cam phaser comprises a range of 80 crank angle degrees.

Variation 5 may include a method as set forth in any of Variations 1-4 wherein fully or partially retarding the extended range intake cam phaser delays the closing of an intake valve to prevent pre-ignition.

Variation 6 may include a method as set forth in any of Variations 1-5 wherein the spark timing is retarded up to 22 degrees after a piston reaches a top dead center position to improve NVH.

Variation 7 may include a method as set forth in any of Variations 1-6 wherein the extended range intake cam phaser is a dual park phaser.

Variation 8 may include a method as set forth in Variation 7 wherein the dual park phaser allows the selection of a first cam position and a second cam position; and wherein the first cam position is used for a warm start engine condition and wherein the second cam position is used for a cold start engine condition.

Variation 9 may include a method comprising: eliminating pre-ignition of a first combustion cycle during warm restart of a stop/start vehicle comprising: providing a camshaft operatively connected to an extended range intake cam phaser; fully or partially retarding the extended range intake cam phaser during a warm engine restart to control a position of the camshaft to delay a closing of an intake valve to prevent pre-ignition; and retarding the spark timing of a spark plug to improve NVH.

Variation 10 may include a method as set forth in Variation 9 wherein the extended range intake cam phaser comprises a range of 70-80 crank angle degrees.

Variation 11 may include a method as set forth in Variation 9 wherein the spark timing is retarded up to 22 degrees after a piston reaches a top dead center position.

Variation 12 may include a method as set forth in any of Variations 9-10 wherein the extended range intake cam phaser allows the selection of a first cam position and a second cam position; and wherein the first cam position is used for a warm start engine condition and wherein the second cam position is used for a cold start engine condition.

Variation 13 may include a method comprising: improving a port-fuel injection engine stop/start system comprising: eliminating pre-ignition of a first combustion cycle during warm restart comprising: providing a camshaft operatively connected to an extended range intake cam phaser having a range of 70 crank angle degrees to 80 crank angle degrees and fully retarding a timing of the extended range intake cam phaser during a warm restart of an engine to control a position of a camshaft; and retarding a spark timing in a first firing cycle up to 22 degrees after top dead center.

Variation 14 may include a product comprising: a start/stop vehicle combustion engine comprising: a camshaft; an extended range intake cam phaser operatively connected to the camshaft, wherein the extended range intake cam phaser comprises a range of 70 to 80 crank angle degrees and wherein when the extended range intake cam phaser is fully or partially retarded during a warm engine restart, the closing of an intake valve is delayed so that a spark timing is effective in controlling combustion in a first firing cycle with no pre-ignition.

Variation 15 may include a product as set forth in Variation 14 wherein the extended range intake cam phaser comprises a first cam position and a second cam position; and wherein the first cam position is used for a warm start engine condition and wherein the second cam position is used for a cold start engine condition.

Variation 16 may include a product as set forth in any of Variations 14-15 wherein the extended range intake cam phaser is a dual park phaser.

The above description of select variations within the scope of the invention is merely illustrative in nature and, thus, variations or variants thereof are not to be regarded as a departure from the spirit and scope of the invention.

What is claimed is:

1. A method comprising:
    controlling a combustion phase timing in a first firing cycle of a stop/start combustion engine comprising:
    providing a camshaft operatively connected to an extended range intake cam phaser having a range of authority over 50 crank angle degrees;
    fully or partially retarding the extended range intake cam phaser 20 to 30 crank angle degrees further than a non-extended range cam phaser having a range of authority of 50 crank angle degrees during a restart of the engine to control a position of the camshaft and preventing combustion before a spark is discharged; and
    retarding a timing of the spark up to 22 degrees after a piston reaches a top dead center position in the first firing cycle to delay the combustion phase timing to improve Noise, Vibration, and Harshness (NVH).

2. The method of claim 1 wherein the restart of the engine is a warm restart.

3. The method of claim 1 wherein the extended range intake cam phaser comprises a range of authority of 70 crank angle degrees.

4. The method of claim 1 wherein the extended range intake cam phaser comprises a range of authority of 80 crank angle degrees.

5. The method of claim 1 wherein fully or partially retarding the extended range intake cam phaser delays a closing of an intake valve to prevent combustion before the spark is discharged.

6. The method of claim 1 wherein the extended range intake cam phaser is a dual park phaser.

7. The method of claim 6 wherein the dual park phaser allows the selection of a first cam position and a second cam position; and
    wherein the first cam position is used for a warm start engine condition and wherein the second cam position is used for a cold start engine condition.

8. A method comprising:
    eliminating pre-ignition of a first combustion cycle during warm restart of a stop/start vehicle comprising:
    providing a camshaft operatively connected to an extended range intake cam phaser having a range of authority over 50 crank angle degrees;
    fully or partially retarding the extended range intake cam phaser 20 to 30 crank angle degrees further than a non-extended range cam phaser having a range of authority of 50 crank angle degrees during a warm engine restart to control a position of the camshaft to delay a closing of an intake valve and to prevent combustion before a spark is discharged; and
    retarding a timing of the spark of a spark plug up to 22 degrees after a piston reaches a top dead center position to improve NVH.

9. The method of claim 8 wherein the extended range intake cam phaser comprises a range of authority of 70-80 crank angle degrees.

10. The method of claim 8 wherein the extended range intake cam phaser allows the selection of a first cam position and a second cam position; and
    wherein the first cam position is used for a warm start engine condition and wherein the second cam position is used for a cold start engine condition.

11. A method comprising:
    improving a port-fuel injection engine stop/start system comprising:
    eliminating a start of combustion of a first combustion cycle before a spark is discharged during warm restart comprising:
    providing a camshaft operatively connected to an extended range intake cam phaser having a range of authority over 50 crank angle degrees and fully or partially retarding a timing of the extended range intake cam phaser 20 to 30 crank angle degrees further than a non-extended range cam phaser having a range of authority of 50 crank angle degrees during a warm restart of the engine to control a position of a camshaft; and
    retarding a timing of the spark in a first firing cycle up to 22 degrees after top dead center.

12. A product comprising:
    a start/stop vehicle combustion engine comprising:
    a camshaft;
    an extended range intake cam phaser operatively connected to the camshaft, wherein the extended range intake cam phaser comprises a range of authority over 50 crank angle degrees and wherein when the extended range intake cam phaser is fully or partially retarded 20 to 30 crank angle degrees further than a non-extended range cam phaser having a range of authority of 50 crank angle degrees during a warm engine restart, the closing of an intake valve is delayed so that a timing of a spark is effective in controlling combustion in a first firing cycle so that combustion does not start before the spark is discharged.

13. The product of claim 12 wherein the extended range intake cam phaser comprises a first cam position and a second cam position; and
    wherein the first cam position is used for a warm start engine condition and wherein the second cam position is used for a cold start engine condition.

14. The product of claim 12 wherein the extended range intake cam phaser is a dual park phaser.

15. The product of claim 12 wherein the extended range intake cam phaser has a range of authority of 70-80 crank angle degrees.

* * * * *